United States Patent [19]

Schwab

[11] Patent Number: 4,717,532

[45] Date of Patent: Jan. 5, 1988

[54] PRESSURE CONTROL SYSTEM FOR A PRESSURIZED WATER NUCLEAR REACTOR PLANT

[75] Inventor: John A. Schwab, Upper Tyrone Township, Fayette County, Pa.

[73] Assignee: Westinghouse Electric Corp., Pittsburgh, Pa.

[21] Appl. No.: 749,036

[22] Filed: Jun. 26, 1985

[51] Int. Cl.⁴ .................................................. G21C 9/00
[52] U.S. Cl. ............................ 376/283; 261/64.1; 261/124; 261/DIG. 76; 376/307
[58] Field of Search ............... 137/592; 261/64 B, 124, 261/DIG. 76; 376/283, 307

[56] References Cited

U.S. PATENT DOCUMENTS

| | | | |
|---|---|---|---|
| 3,808,123 | 4/1974 | Neel | 261/124 |
| 3,899,391 | 8/1975 | Sulzer et al. | 376/283 |
| 4,086,308 | 4/1978 | Jürgens et al. | 376/283 |
| 4,213,824 | 7/1980 | Jabsen | 376/283 |
| 4,252,611 | 2/1981 | Mizumachi et al. | 376/283 |
| 4,294,310 | 10/1981 | Reusch et al. | 137/592 |
| 4,305,896 | 12/1981 | Tominaga et al. | 376/283 |
| 4,399,082 | 8/1983 | Becker et al. | 376/283 |
| 4,470,948 | 9/1984 | Aanstad et al. | 376/283 |
| 4,584,164 | 4/1986 | McMullin et al. | 376/283 |

FOREIGN PATENT DOCUMENTS 86997  7/1978  Japan .................................. 376/283

OTHER PUBLICATIONS

10 CFR 50.62, dated Jul. 31, 1985.
NUREG0460 vol. 4, pp. B-2, 3: D-1, 2, 3.
"A Study of the Problem of Anticipated Transients Without Scram (ATWS)", Energy Commission Collective Report, vol. 20, No. 1, Feb. 1984.
Olivon, Nuclear Engineering International, May 1984, pp. 40-43.

Primary Examiner—Deborah L. Kyle
Assistant Examiner—Richard W. Wendtland
Attorney, Agent, or Firm—Daniel C. Abeles

[57] ABSTRACT

An improved pressure control system for a pressurized water nuclear reactor plant contains a novel, two stage sparger in the pressurizer relief tank. The two stage sparger has a primary conduit and secondary conduit, both of which have orifices through the walls thereof, and an interconnecting valve that is responsive to a pressure differential between the two conduits. The secondary conduit is preferably of a diameter less, but with a larger area of flow therefrom, than the primary conduit and is bifurcated, with two leg sections extending back towards the primary conduit.

18 Claims, 5 Drawing Figures

PRESSURE CONTROL SYSTEM FOR A PRESSURIZED WATER NUCLEAR REACTOR PLANT

BACKGROUND OF THE INVENTION

The present invention relates to a pressurized water nuclear reactor power plant and specifically to an improved sparger system for use in the pressurizer relief tank for use in such plants which protects the plant from overpressure and thus, provides safe plant operation.

In a pressurized water nuclear reactor plant, a primary coolant loop and secondary coolant loop are used to produce steam for the production of electricity. In the primary coolant loop, a pressurized fluid is passed through a nuclear reactor and, after being heated, through a line which contains a pressurizer, to a steam generator. The heated fluid enters the primary side of the steam generator which is divided into an inlet section and an outlet section by a divider plate. A tube sheet divides the steam generator into the primary side and a second side, which tube sheet has an array of holes having U-shaped heat transfer tubes inserted therein, which communicate between the inlet section and outlet section of the primary side of the steam generator. In operation, the heat pressurized fluid passes through the U-shaped heat transfer tubes and is discharged from the outlet section of the primary side of the steam generator to a line, containing a primary coolant pump, back to the reactor in a continuous closed loop. Secondary coolant is passed through the secondary side of the steam generator where it is converted into steam by heat released by the primary coolant passing through the U-shaped heat transfer tubes, which steam is used to drive a turbine to produce electricity.

The reactor coolant pressure is controlled by a pressure control system containing a pressurizer, which is a vertical, cylindrical vessel with hemispherical top and bottom heads, wherein water and steam are maintained in equilibrium by electrical heaters and water sprays. Steam can be formed by activating the heaters to increase the pressure in the primary coolant loop, or condensed by the water sprays to reduce the pressure. Power operated relieve valves and spring loaded safety valves are connected to the pressurizer and discharge to a pressurizer relief tank, where steam from the pressurizer is condensed and cooled by mixing with water.

The pressure control system for the primary loop thus includes the pressurizer and the associated sprays, heaters, power operated relief valves, safety valves, relief tank, and surge lines. This equipment is designed to accommodate changes in system volume and to limit changes in system pressure due to reactor coolant loop temperature variations during all modes of plant operation.

To reduce the problem of leakage through the valve seats, a water seal is maintained upstream of each valve seat of the pressurizer valves. The pipes connecting the pressurizer nozzles to their respective valves are shaped in the form of a loop seal. If the pressurizer pressure exceeds the set pressure of the valves, they will open, and the water from the loop seal will discharge during the accumulation period.

In order to avoid steam release to the containment from the nuclear reactor during normal and upset condition operation, the power operated relief valves (PORV) and the safety valves (SV) are thus mounted on the pressurizer and are routed to a pressurizer relief tank. The pressurizer relief tank is a partially water filled tank having a nitrogen cover gas. Hot fluids, water and steam, discharged from the power operated relief valves and safety valves are distributed into the water in the pressurizer relief tank by means of a sparger therein which conventionally is comprised of a straight conduit having a plurality of orifices therein. Typically, the sparger comprises a 12" pipe with a plurality of small orifices (about ½ inch diameter) in long rows no more than about 30° above and below the horizontal axis of the pipe.

The number of orifices in the sparger is based on the efficient condensation of the steam flow through the sparger associated with the peak volumetric surge rate into the pressurizer during an assumed loss of load (100%) without immediate reactor trip or shutdown. Long, approximately 1" in diameter, steam plumes will be produced through each orifice in the sparger for this basic design event. For lower steam flowrates, steam could bubble out of each orifice, while for higher steam flowrates, the steam plumes, almost jets, could penetrate the water surface. For off-design flowrates, condensation efficiency of the steam in the water is reduced.

The pressure drop across the sparger is part of the total safety valve discharge system drop which is conventionally limited to a 500 pounds per square inch differential due to the limitations on the valve backpressure compensating bellows. The 500 pounds per square inch gauge bellows limit, conventionally used, is more conservative than the maximum backpressure of 750 pounds per square inch gauge normally permitted.

The design of a power operated relief valve-safety valve system that accommodates for an anticipated transient without trip (ATWT) is desired. An anticipated transient without trip is an event in which the diverse and independent reactor trip, or shutdown, safety systems fail to immediately shutdown the reactor for an extended time period. Such an event would result in a delay of the reactor trip until after the pressurizer had become completely filled with coolant water, or water solid. Following such an event, the reactor will eventually be shutdown either automatically or manually, but a delay is present. In a typical ATWT event, the insurge of reactor coolant into the pressurizer continues until and after the pressurizer is filled with water. The power operated relief valves open and relieve steam and safety valves open with the pressurizer filled with water. The safety valves discharge water for about 50 seconds while the power operated relief valves discharge water for about 120 seconds. As a result, the pressure drop across the discharge piping and sparger increases dramatically. Valve backpressure increases to approximately 1000 pounds per square inch gauge, well above both the bellows and standard test limits.

In orde to accommodate an anticipated transient without trip event, modification of existing equipment was required. According to the present invention, the discharge piping was increased to 16 inch diameter piping from standard 12" piping, and sparger modifications are provided. A simple increase in the size of the orifices in the sparger was not acceptable since steam condensation efficiency for the nominal (loss of load) design basis was insufficient. Inefficient condensation causes premature rupture of the overpressure rupture disks on the pressurizer relief tank and unnecessary discharge of such steam to the containment.

It is an object of the present invention to provide a pressure control system for a pressurized water nuclear reactor plant that will accommodate normal and anticipated transient without trip events without unnecessary discharge of steam to the containment.

It is another object of the present invention to provide an improved sparger for use in a pressurizer relief tank that provides efficient steam distribution and condensation in the pressurizer relief tank while limiting the pressure drop for normal and anticipated transient without trip events.

SUMMARY OF THE INVENTION

A pressure control system for a pressurized water nuclear reactor plant that includes a pressurizer and safety and relief valves which discharge to a pressurizer relief tank having a two stage sparger in the pressurizer relief tank that is comprised of a primary conduit having orifices, a secondary conduit having orifices, and an interconnecting valve means that is responsive to a predetermined pressure differential between the two conduits.

The check valve is preferably a spring biased valve and the primary conduit preferably larger in diameter than the secondary conduit. A preferred construction of the secondary conduit is one which has a bifurcated construction with two leg sections extending back towards the primary conduit, which provides for a compact design. The orifices in the secondary conduit, or at least a portion thereof, are located in the secondary conduit such that they are at a lower level in the pressurizer relief tank than the orifices of the primary conduit.

DETAILED DESCRIPTION

The present invention provides a pressure control system for a pressurized water nuclear reactor plant containing an improved two stage sparger for use in the pressurizer relief tank that provides efficient steam distribution and condensation in the pressurizer relief tank while limiting the pressure drop for both normal and anticipated transient without trip events.

Figure 1:
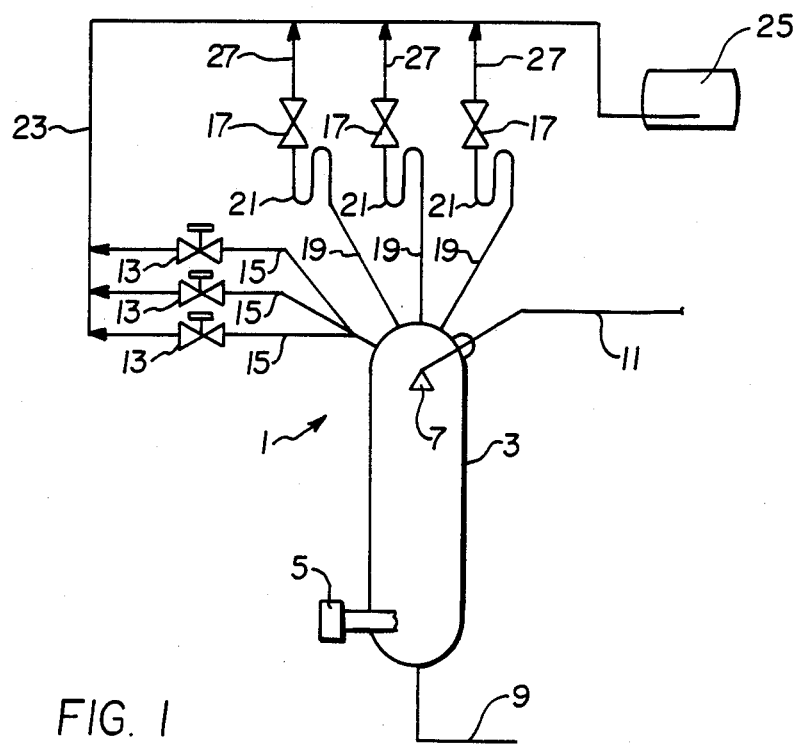
FIG. 1 is a schematic illustration of an improved pressure control system for a pressurized water nuclear reactor plant according to the present invention.

In FIG. 1, there is schematically illustrated a pressure control system for a pressurized water nuclear reactor which can incorporate the two stage sparger apparatus of the present invention. The pressure control system 1 contains a pressurizer 3, normally formed as a vertical, cylindrical vessel, composed of carbon steel with austenitic stainless steel cladding on all surfaces exposed to primary reactor coolant. Electrical heaters 5 are provided in the bottom portion of the pressurizer 3 and spray nozzles 7 are provided in the upper portion thereof. The pressurizer is designed to accommodate positive and negative surges caused by load transients on the system. A surge line 9, attached to the bottom of the pressurizer 3 connects the pressurizer with the hot leg of a reactor coolant loop. During an insurge, the spray nozzles 7 which are fed from the cold leg of the reactor coolant loop through line 11, spray water into the upper portion of the pressurizer 3 to condense steam in the pressurizer 3 to prevent the pressure in the pressurizer from reaching the setpoint of power operated relief valves 13 in lines 15. During an outsurge, flashing of water to steam and generating of steam by actuation of heaters 5 keep the pressure above the low pressure reactor trip setpoint.

The pressurizer 3 is also provided with safety relief valves 17, three being shown in FIG. 1. The safety relief valves 17, in lines 19, are spring loaded or self-activated with back pressure compensation, and loop seals 21 are provided in lines 19 for valve protection. Such loop seals (not shown) are also normally provided in lines 15 for the protection of power operated relief valves 13. The combined capacity of the safety relief valves 17 is equal to, or greater than, the maximum surge rate resulting from the complete loss of load without reactor trip or any other control. Power operated relief valves 13 discharge to line 23 to a pressurizer relief tank 25 which contains a sparger, while safety relief valves 17 discharge into branch lines 27 which communicate with line 23 and to the pressurizer relief tank 25. In such conventional systems, the line 23 to the pressurizer relief tank was normally 12 inches in diameter and the sparger, attached to the end of line 23, within the pressurizer relief tank, was also a 12" diameter pipe with $\frac{1}{2}$ inch orifices therein, and having an end cap.

Figure 2:
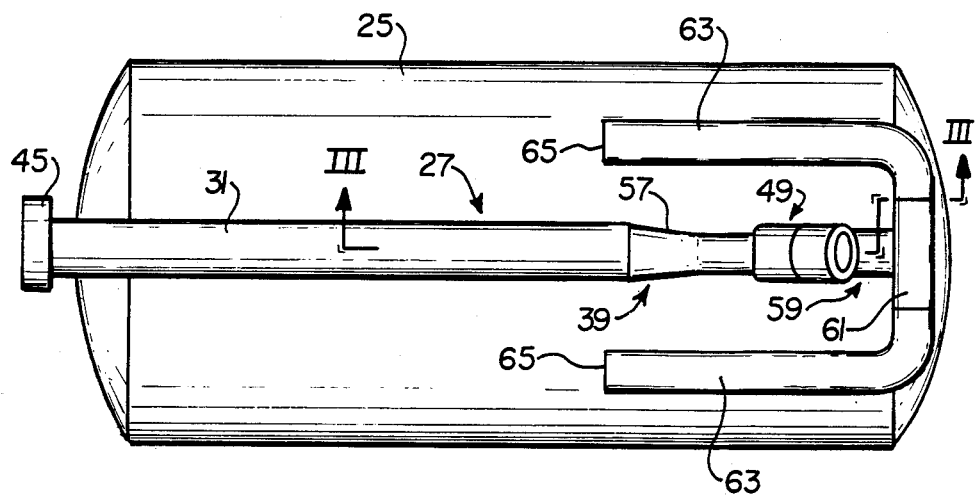
FIG. 2 is a schematic plan view of the two stage sparger in the pressurizer relief tank.
Figure 3:
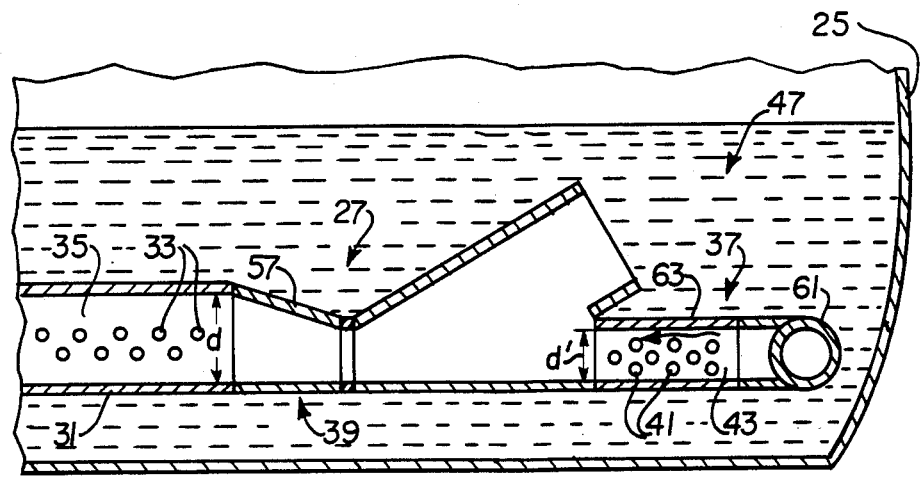
FIG. 3 is a cross-sectional view taken along lines III—III of FIG. 2 showing the two stage sparger in the liquid coolant, with the check valve means removed.

In the improved pressure control system of the present invention, the sparger within the pressurizer relief tank is a two stage sparger which is comprised of a primary conduit having orifices, a secondary conduit having orifices, and an intermediate valve means actuated by a pressure differential between the two conduits. Referring now to FIGS. 2 and 3, the two stage sparger 27 in a closed pressurizer relief tank 25 has a primary conduit 31 which has orifices 33 formed in walls 35 thereof, and a secondary conduit 37 attached to the terminus 39 of the primary conduit, the secondary conduit 37 having orifices 41 formed in the walls 43 thereof. The orifices 33 and 41 are formed in long rows, along the horizontal axis of the conduit and are located, in the side walls of the conduit, normally within an area no more than about 30° above and below the horizontal axis. A coupling 45 is attached to the inlet end of the primary conduit 31 for connection thereof to the line 23 of the pressure control system.

The two stage sparger is located in the pressurizer relief tank within a supply of liquid coolant 47 such as water, and rupture disks (not shown) are provided on the closed pressurizer relief tank.

A valve means 49 (FIGS. 4 and 5) connects the primary conduit 31 and the secondaary conduit 37 together, such that communication between the two conduits is effected, when desired. The valve means 49 preferably comprises a spring loaded check valve having a valve seat 51, closure element 53 and a biasing spring 55 that biases the closure element against the valve seat to close the valve. As illustrated, the terminus 39 of the primary conduit may have a step-down section 57 thereon which enables the use of a secondary conduit 37 of a diameter d' less than the diameter d of the primary conduit 31. As an example of such dimensions, the line 23 from the power operated relief valves and safety relief valves can be about 16 inches in diameter, the primary conduit 31 would be about 16 inches in diameter, and the secondary conduit 37 of about 12 inches in diameter.

At least a portion of the orifices 41 in the secondary conduit 37 should be below the level, or horizontal plane. of the orifices 33 in the primary conduit 31 so as to insure that water will pass through the primary conduit 31, and valve 49 to the secondary conduit 37 for discharge therefrom. Also, the total area of flow through the orifices 41 of the secondary conduit 37 should be greater than the total area of flow through the orifices 33 of the primary conduit 31, and preferably about 125 percent of the flow area of the orifices of the primary conduit. This increase in flow area through the orifices in the secondary conduit can be effected by the use of a larger number of such orifices or by providing orifices through the walls of the secondary conduit of a diameter greater than the diameter of the orifices through the walls of the primary conduit.

As illustrated, a preferred construction of the secondary conduit 37 has a connecting section 59 communicating with the check valve 49, and is bifurcated (FIG. 2) at cross section 61 to form two leg portions 63 which extend back towards the primary conduit 31. The leg sections have end caps 65 at the ends thereof. The orifice 39 can be formed in the connecting section 59, cross section 61, the leg sections 63, and the end caps 65, the number of orifices and placement thereof along the secondary conduit dependent upon the flow are desired.

In the operation of the pressure control system of the present invention, in the event of an anticipated transient without trip, the following would occur. With a loss of load on the reactor, without a reactor trip, or shutdown, the reactor coolant system pressure in the pressurizer 3 increases rapidly. The power operated relief valves 13 and safety valves 17 would open to discharge cold water loop water seals and steam into the line 23 to the pressurizer relief tank 25. The loop seal "plugs", or water seals, compress nitrogen in the line 23 which forces water in the primary conduit 31 out through the orifices 33. As the pressure in the primary conduit 31 exceeds a predetermined pressure, preferably of about 50 psig (such pressure could rise to a value of about 400 psig in a conventional sparger), the check valve 49 opens and the fluid passes to the secondary conduit 37, which, with orifices 41 more than doubles the total flow area for fluid from the sparger. Water in the primary conduit 31 is discharged therefrom to the secondary conduit 37, and out of the orifices 41, reducing the pressure in the primary conduit to below the predetermined value and the check valve 49 closes as steam reaches the pressurizer relief tank through line 23. Steam discharged through the orifices 33 of the primary conduit 31 is condensed in the water 47 in the pressure relief tank 25 since the design of the primary conduit is effective to maintain a pressure differential below the predetermined value that would actuate the check valve. The steam content of the pressurizer 3 is discharged with the pressurizer relief tank at about 50 psig pressure and 200° F. The reactor coolant system pressure increases (2500 psig to 2750 psig) when the pressurizer becomes water filled and water discharge from the pressurizer 3 through power operated relief valves 13 and safety valves 17 to line 23 begins. With the pressurizer filled with, and discharging water, the volumetric discharge through the power operated relief valves and safety valves is unchanged but mass flowrate is increased by roughly a factor of 5. As the water flow increases through the line 23 to the primary conduit 31, valve backpressure increases and the pressure differential between the primary conduit 31 and secondary conduit 37 increases to above the predetermined value and the check valve 49 again opens to provide for flow through the orifices of both sparger conduits, until the reactor is tripped either automatically or manually.

Figure 4:
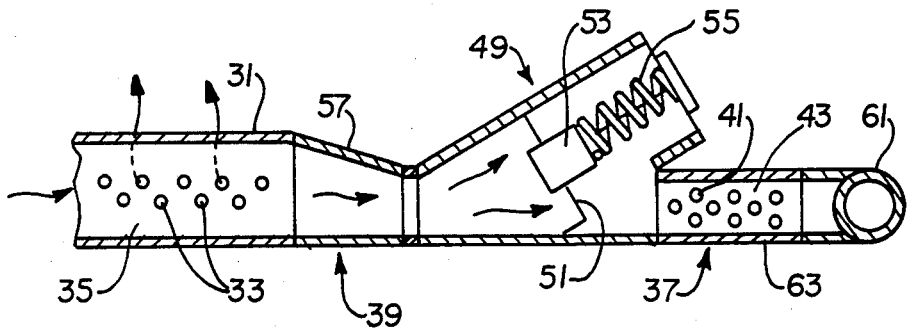
FIG. 4 is a cross-sectional view similar to FIG. 3 showing flow of fluid through the sparger with the check valve in closed position.
Figure 5:
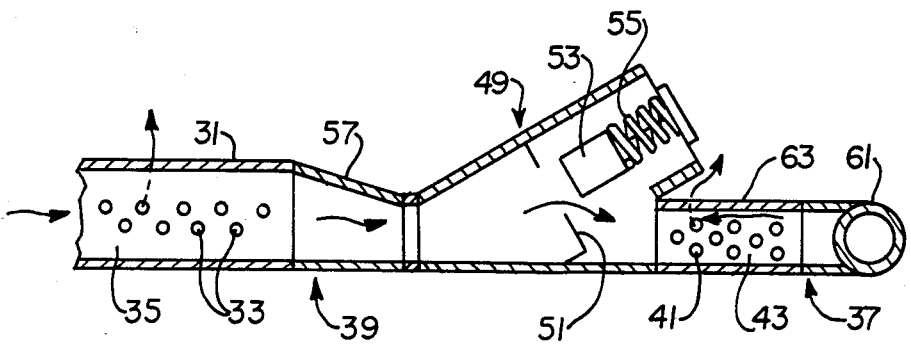
FIG. 5 is a cross-sectional view similar to FIG. 3 showing flow of fluid through the sparger with the check valve in open position.

The flow through the sparger is illustrated in FIGS. 4 and 5 which illustrate fluid flow through the orifices 33 of the primary conduit 31 when the check valve 49 is closed, and fluid flow through both the orifices 33 of primary conduit 31 and orifices 41 of secondary conduit 37 when the check valve 49 is in open position.

What is claimed is:

1. In a pressure control system of a pressurized water nuclear reactor plant, containing a pressurizer, water sprayers, heaters, power operated relief valves, safety valves, and a pressurizer relief tank, containing a liquid coolant, having a sparger therein for release of water and steam from the pressurizer, the improvement wherein said sparger comprises:
   a primary conduit having a terminus, terminating within the liquid coolant in the pressurizer relief tank, said conduit having orifices therein for discharge of fluid therefrom;
   a secondary conduit, attached to said terminus of said primary conduit, having orifices therein for discharge of fluid therefrom; and
   valve means through which said primary and secondary conduits communicate, said valve means responsive to a predetermined pressure differential across said valve means between said primary and secondary conduits.

2. A pressure control system for a pressurized water reactor nuclear plant as defined in claim 1 wherein the orifices in said primary conduit are at a first depth within said liquid coolant, and wherein at least a portion of the orifices in said secondary conduit are at a greater depth.

3. A pressure control system for a pressurized water reactor nuclear plant as defined in claim 2 wherein the total area of flow through the orifices in said secondary conduit is greater than the total area of flow through the orifices in said primary conduit.

4. A pressure control system for a pressurized water reactor nuclear plant as defined in claim 3 wherein the orifices in said secondary conduit are of a diameter greater than the diameter of the orifices in said primary conduit.

5. A pressure control system for a pressurized water reactor nuclear plant as defined in claim 1 wherein said secondary conduit is a bifurcated conduit having two leg portions which extend back towards said primary conduit.

6. A pressure control system for a pressurized water reactor nuclear plant as defined in claim 5 wherein said secondary conduit has a diameter less than the diameter of said primary conduit.

7. A pressure control system for a pressurized water reactor nuclear plant as defined in claim 1 wherein said valve means is a spring biased valve responsive to said predetermined pressure differential.

8. A pressure control system for a pressurized water reactor nuclear plant as defined in claim 7 wherein said spring biased valve is responsive to a pressure differential of about 50 pounds per square inch gauge pressure.

9. In a pressure control system of a pressurized water nuclear reactor plant, containing a pressurized, water sprayers, heaters, power operated relief valves, safety valves, and a pressurizer relief tank, containing a liquid coolant, having a sparger therein for release of water and steam from the pressurizer, the improvement wherein said sparger comprises:

a primary conduit of a first diameter, having orifices therein for discharge of fluid therefrom, having a first total are of flow through said orifices;

a secondary conduit of a second diameter less than said first diameter, having orifices therein for discharge of fluid therefrom, having a second total area of flow through said orifices greater than said first total area of flow, with at least a portion of said orifices being below the level of the orifices of said primary conduit; and a spring biased valve through which said primary and secondary conduits communicate, said valve responsive to a predetermined pressure differential across said valve between said primary and secondary conduits.

10. A pressure control system for a pressurized water nuclear reactor plant as defined in claim 9 wherein said secondary conduit is a bifurcated conduit having two leg portions which extend back towards said primary conduit.

11. A pressure control system for a pressurized water nuclear reactor plant as defined in claim 10 wherein the orifices in said secondary conduit are of a diameter greater than the diameter of the orifices in said primary conduit.

12. A two stage sparger comprising:

a primary conduit having orifices therein for discharge of fluid therefrom;

a secondary conduit, attached to the terminus of said first conduit, having orifices therein for discharge of fluid therefrom; and valve means through which said primary and secondary conduits communicate, said valve means responsive to a predetermined pressure differential across said valve means between said primary and secondary conduits.

13. A two stage sparger as defined in claim 12 wherein at least a portion of the orifices in said secondary conduit are below the horizontal level of the orifices in said primary conduit.

14. A two stage sparger as defined in claim 13 wherein the total area of flow through the orifices in said secondary conduit is greater than the total area of flow through the orifices in said primary conduit.

15. A two stage sparger as defined in claim 14 wherein the orifices in said secondary conduit are of a diameter greater than the diameter of the orifices in said primary conduit.

16. A two stage sparger as defined in claim 12 wherein said secondary conduit is a bifurcated conduit having two leg portions which extend back towards said primary conduit.

17. A two stage sparger as defined in claim 16 wherein said secondary conduit has a diameter less than the diameter of said primary conduit.

18. A two stage sparger as defined in claim 12 wherein said valve means is a spring biased valve responsive to said predetermined differential.

* * * * *